US012791881B2

(12) United States Patent
Wilke

(10) Patent No.: US 12,791,881 B2
(45) Date of Patent: Nov. 10, 2026

(54) SYSTEMS FOR MEASURING EYE RELIEF AND METHODS OF USE

(71) Applicant: Government of the United States as Represented by the Secretary of the Army, Natick, MA (US)

(72) Inventor: Douglas E. Wilke, White Marsh, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 282 days.

(21) Appl. No.: 18/642,873

(22) Filed: Apr. 23, 2024

(65) Prior Publication Data

US 2025/0328032 A1 Oct. 23, 2025

(51) Int. Cl.
*G02C 13/00* (2006.01)

(52) U.S. Cl.
CPC .................................. *G02C 13/005* (2013.01)

(58) Field of Classification Search
CPC .................................................... G02C 13/005
USPC .......................................................... 351/200
See application file for complete search history.

(56) References Cited

U.S. PATENT DOCUMENTS 4,523,384 A * 6/1985 Giacomini ............. G01B 5/207 33/608
9,772,497 B1 * 9/2017 Hewlett ................. G02B 7/002
10,275,024 B1 * 4/2019 Simmons ................ G06F 3/013
11,782,288 B2 * 10/2023 Mirabella .......... G02B 27/0176 359/462
2014/0190030 A1 * 7/2014 Sano ........................ G01B 5/24 33/534
2020/0310537 A1 * 10/2020 Simmons ........... G02B 27/0172
2021/0080746 A1 * 3/2021 Mirabella .......... G02B 27/0172
2023/0075963 A1 * 3/2023 Arita .................... A61B 3/0091
2024/0012257 A1 * 1/2024 Wang ................. G02B 27/0176
2024/0094548 A1 * 3/2024 Pomeroy .................. G02B 7/12
2024/0192462 A1 * 6/2024 Matzinger .............. G02B 7/023
2024/0241374 A1 * 7/2024 Hoekman .......... G02B 27/0172
2025/0013000 A1 * 1/2025 Chambers .......... G02B 27/0176
2025/0060426 A1 * 2/2025 Johnson ................... G02B 7/12
2025/0247598 A1 * 7/2025 Lee .................... G02B 27/0172
2025/0258381 A1 * 8/2025 Seadat Beheshti .......................... G02B 27/0172

* cited by examiner

*Primary Examiner* — William R Alexander
(74) *Attorney, Agent, or Firm* — Timothy M. Barlow

(57) ABSTRACT

Provided herein are methods and systems for measuring eye relief. A method for measuring eye relief generally includes placing an optical device on a support; inserting a measuring device into the support; extending a rod of the measuring device through a channel of the support into an eye-relief space of the optical device; contacting an end of the rod to the optical device; translating a locking device along the rod until the locking ring contacts the support; locking the locking ring in position by actuating a locking mechanism; and measuring a distance between an indicator on the rod and the locking ring; wherein the distance between the end of the rod and the indicator is equivalent to a length of the channel, such that the eye relief is the distance between the indicator and the locking ring.

19 Claims, 3 Drawing Sheets

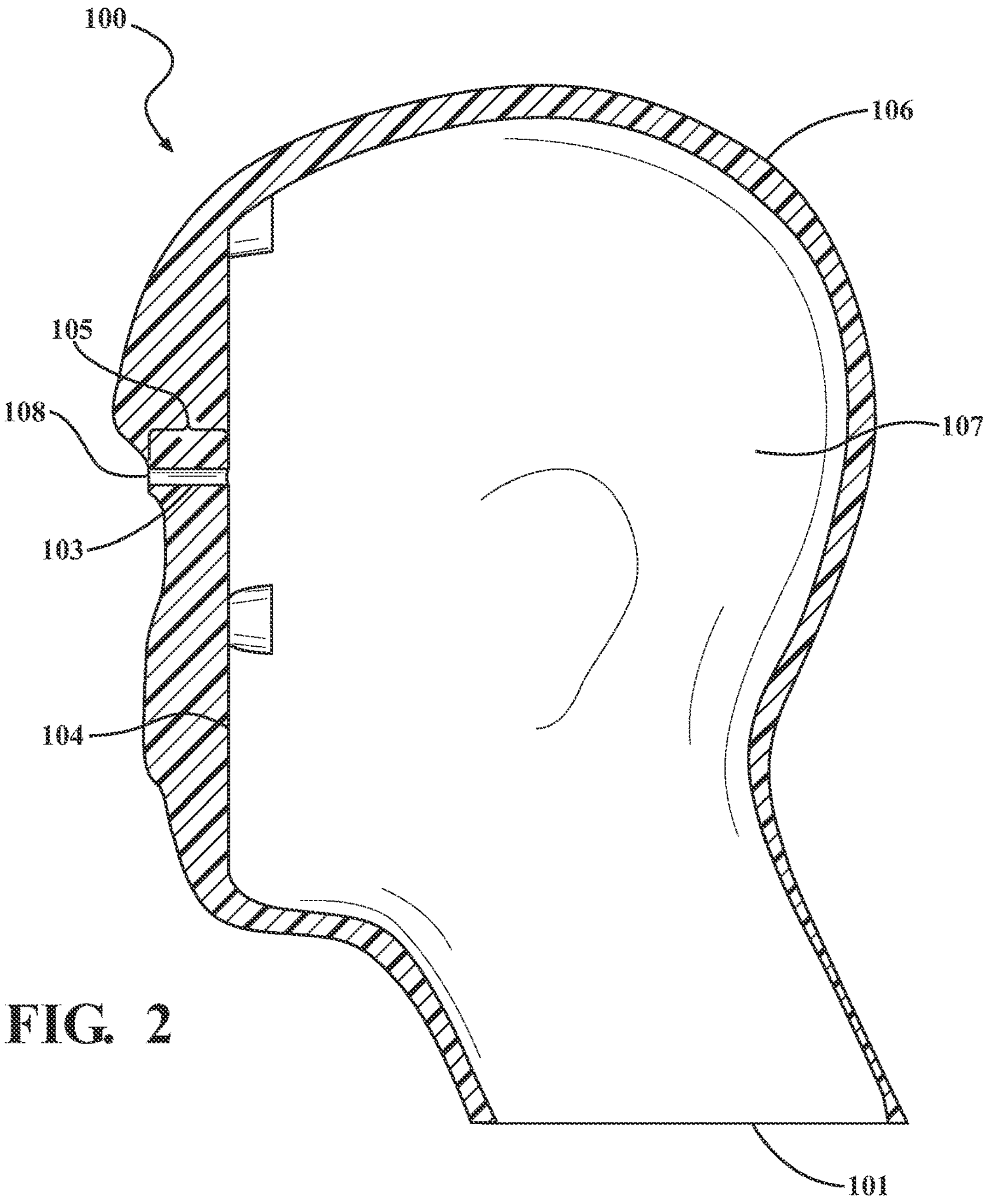
FIG. 2
FIG. 3
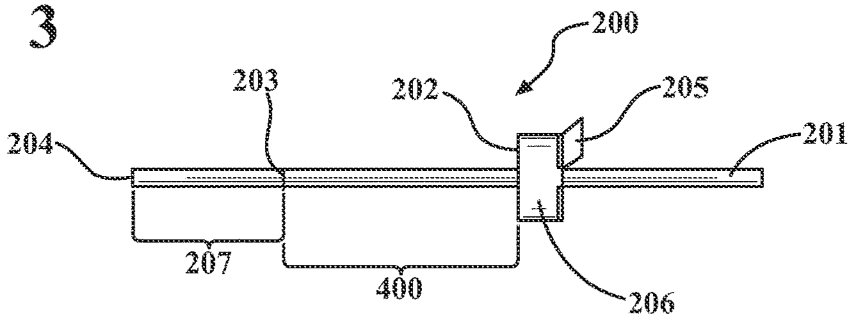

SYSTEMS FOR MEASURING EYE RELIEF AND METHODS OF USE

TECHNICAL FIELD

The present disclosure relates generally to the field of eye relief measurement, and in particular systems and methods for measuring eye relief.

BACKGROUND

Eye relief refers to the distance between the last surface of an eyepiece, such as those found in glasses, binoculars, telescopes, microscopes, or rifle scopes, and the user's eye, while still allowing the user to see the entire field of view. This distance is crucial for comfort and effectiveness of the apparatus.

Conventional methods of measuring eye relief exist, but each have significant limitations. The first conventional method of measuring eye relief involves creating an aperture in the lens to insert a measuring device to measure the eye relief distance. However, this method necessitates the lens's destruction and demands visibility of the lens's backside. Furthermore, in cases of tinted ski goggles or VR headsets, direct observation of the interior to gauge the position of the measuring tool may be impractical, as such eyewear typically envelops the eye.

An alternative approach to determining eye relief involves measuring focal length. This method utilizes the principles of optics, enabling the light passing through a pair of reading glasses to be concentrated on the surface of a user's eye or a head model. This technique, however, necessitates a transparent lens and an unobstructed pathway to the eye. Unfortunately, this method is not applicable for enclosed headsets, as such a design obstructs the path needed for this measurement.

The third traditional method of measuring eye relief involves creating a hole through the eye region of a head model, extending directly backwards and exiting at the rear of the model. A measuring instrument can then be threaded through this head model from back to front until it reaches the reading glasses. However, this method has its constraints, as headwear like helmets, hoods, and support harnesses might obstruct the entry point at the back, hindering the insertion of the measuring device. Moreover, to accurately note the position of the measuring tool relative to the eye surface, it is essential to have a clear view of the device from either the front or the back.

The existing methodologies exhibit limitations related to the destructiveness of the procedure, visibility requirements, and applicability to different types of eyewear, especially those that are enclosed or obstructed.

Accordingly, a need exists to develop systems designed to facilitate eye relief measurements irrespective of factors like visibility of the lens's rear side, accessibility to the front of the eye, transparency of the object, or access to the back of the head and to accurately measure eye relief for intricate head-worn systems that cover the eyes.

SUMMARY

The instant disclosure generally relates to systems and methods for determining eye relief.

Example embodiments disclosed herein are directed to a method for determining eye relief. The method includes placing an optical device on a support and extending a rod of a measuring device through a channel of the support into an eye-relief space of the optical device. An end of the rod contacts the optical device. A locking ring is translated along the rod until the locking ring contacts the support. The locking ring is locked in position by actuating a locking mechanism. The distance between the end of the rod and the indicator is equivalent to a length of the channel, such that the eye relief is determined as a distance between the indicator and a position on the locking ring contacting the support. Optionally, the support is a human headform or an animal headform.

Optionally, the support includes an external surface forming a shape simulating an external surface of one or more eyes. In some embodiments, the channel terminates at an aperture defined by the external surface of the eye at a first end and at a hollow interior of the support at a second end. Optionally, the support includes an external surface defining a hollow interior. In some embodiments the external surface defines an opening for accessing the hollow interior, wherein the opening is positioned at an inferior end of the support. Optionally, the measuring device is inserted through the opening. In some embodiments, the support includes a vertical surface disposed in the hollow interior. Optionally, contacting the locking ring with the support comprises contacting the vertical surface with the locking ring.

Another embodiment disclosed herein relates to a system for measuring eye relief. The system includes a support having an external surface defining one or more channels, wherein the one or more channels extend from the external surface perpendicularly to a vertical axis of the support; and a measuring device having a rod, adapted to be inserted through the one or more channels, wherein the rod comprises an indicator positioned from an end of the rod at a distance equivalent to the length of the one or more channels; and a locking ring slidably coupled to the rod.

These and other features, aspects, and advantages will become better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, the claims, as well as the appended drawings.

BRIEF DESCRIPTION OF THE DRAWINGS

FIG. 2 depicts a partial cutaway of the support of the system of FIG. 1 according to one or more embodiments described herein.

FIG. 3 depicts an illustrative measuring rod for use with the system of FIG. 1 according to one or more embodiments described herein.

DETAILED DESCRIPTION

Figure 1:
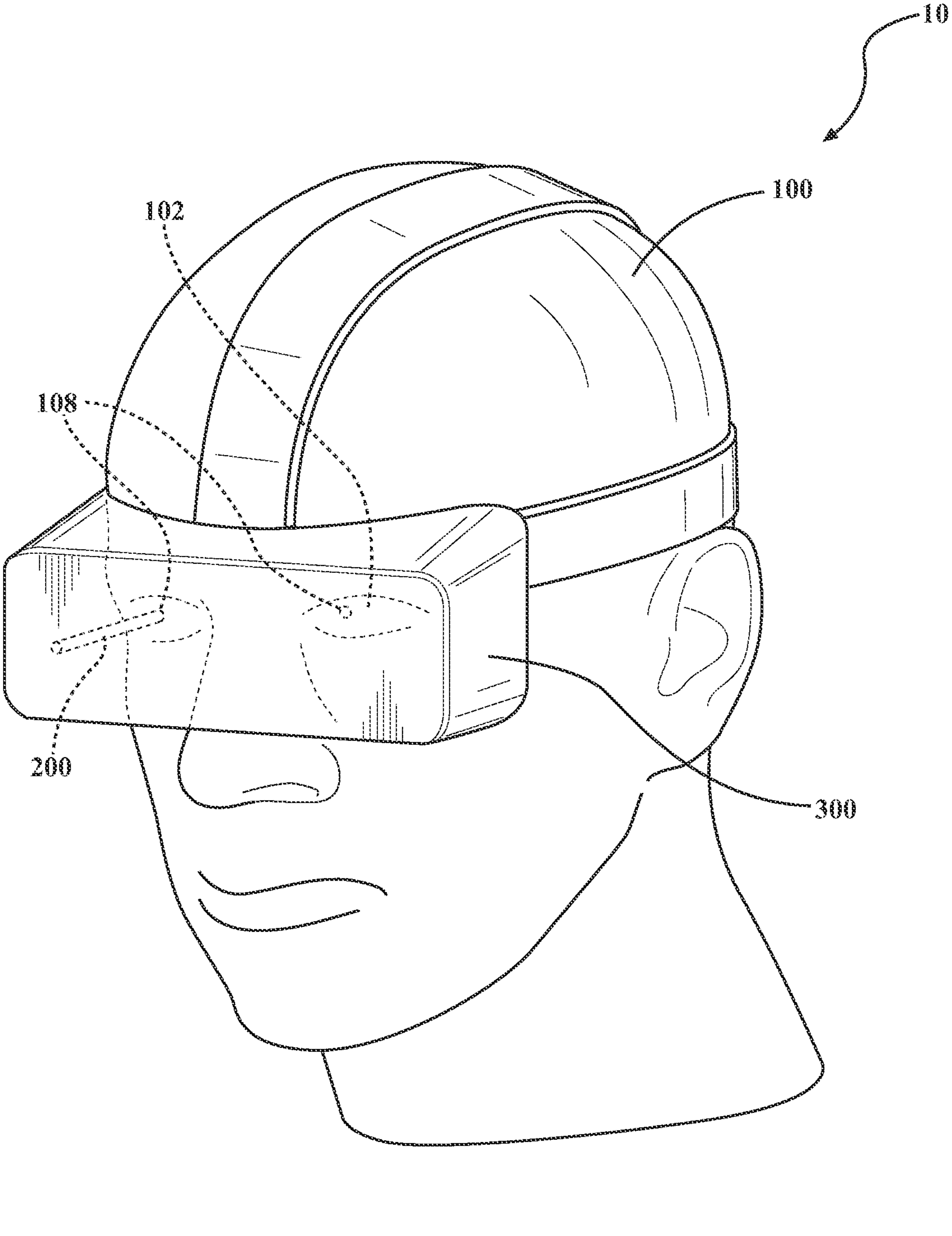
FIG. 1 depicts an illustrative system for measuring eye relief according to one or more embodiments described herein.

The present disclosure generally relates to an optical measurement system designed to assess eye relief. The embodiments described herein overcome challenges present in conventional eye relief measurements, such as the inability to see the back of a lens or the front of the eye, the transparency of the optical device, or the back of the head. The embodiments described herein ensure uniformity in measurements across various designs and types of optical devices, resulting in precision and adaptability in its measurement capabilities. Embodiments of the present disclosure can be used in a variety of fields illustratively where accurate eye relief measurements are crucial for the comfort and effectiveness of eyewear and optical devices, such as optometry, lens design, and optical engineering.

The details of one or more embodiments of the presently-disclosed subject matter are set forth in this document. Modifications to embodiments described in this document, and other embodiments, will be evident to those of ordinary skill in the art after a study of the information provided in this document. Features and elements described herein may be combined in any desired manner to achieve desired performance and functionality goals.

Unless defined otherwise, all technical and scientific terms used herein have the same meaning as commonly understood by one of ordinary skill in the art to which the presently-disclosed subject matter belongs.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. The term "substantially" is used herein also to represent the degree by which a quantitative representation may vary from a stated reference without resulting in a change in the basic function of the subject matter at issue. Thus, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something less than exact.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The present disclosure generally relates to systems and methods for measuring eye relief. The system and methods described herein overcome challenges with conventional techniques by enabling eye relief measurements to be recorded regardless of the ability to see the back of a lens, front of the eye, the transparency of the optical device, or the availability of the back of the head.

As used herein, "eye relief" refers to the distance from the cornea of a user's eye to the lens of an optical device worn by the user. In some embodiments, "eye relief" refers to the distance between the eye lens of an optical device and a reference aperture in a support 100, described in greater detail herein. In some embodiments, the support 100 mimics the anatomical features of one or more users, such that the reference aperture mimics the placement of the user's cornea to calculate eye relief.

The methods for measuring eye relief using the systems described herein generally include placing an optical device on a support, inserting a measuring device into the support, and extending a rod of the measuring device through a channel of the support. As the rod is extended through the channel, an end of the rod contacts the optical device. The method also generally involves translating a locking ring along the rod until the locking ring contacts the support. The locking ring is locked into position along the rod and the measuring device is removed from the support. The eye relief is determined by measuring the distance from an indicator on the rod and the locking ring wherein the distance between the end of the rod and the indicator is equivalent to a length of the channel, such that the eye relief is the distance between the indicator and the locking ring.

As illustrated in FIG. 1, the system 10 generally includes a support 100 and a measuring device 200. The measuring device 200 is used to measure the eye relief between the support 100 and an optical device 300. The support 100 is adapted to position the optical device 300 such that when the optical device 300 is placed on the support 100, the positioning emulates the manner in which a user would typically wear the optical device 300.

In embodiments, such as illustrated in FIG. 1, the support 100 simulates a head. In some embodiments, the support 100 simulates a human head. In other embodiments, the support 100 simulates an animal head, such as a dog, a horse, or the like. As used herein "headform" refers to a support simulating a head. For example, and without being bound by theory, in some embodiments, a headform simulates a head when it is within 75 percent in external measurements and shape of the anthropometric measurements relative to a standard headform. In embodiments where the headform is customized, the headform simulates a head when it is within 75 percent in external measurements and shape of the anthropometric measurements relative to the intended user(s).

In some embodiments the support is a human headform. In some embodiments, the support is an animal headform. Optionally, the support is a dog headform. The basic anatomical requirements of the anticipated user(s) of eye and face protection are to be considered when selecting an appropriate size support 100. Generally, the support 100 is adapted to provide anatomical accuracy, including contours and/or features that replicate relevant aspects, such as forehead, temples, ears, eyes, etc. In some embodiments, the support 100 is a standard headform, such as those described in ISO 16976, ISO 18526, ISO 16321, ISO 18527, ISO 21987, EN 166, and/or EN 168, the contents of each of which are incorporated herein by reference. Optionally, the standard headform is a NIOSH headform. For example, the NIOSH headform is optionally selected from one of the five standard headform sizes (i.e., small, medium, large, long/narrow, and/or short/wide). In some embodiments, the headform is a headform described in ISO 16976-2 Respiratory Protective Devices-Human Factors-Part 2: Anthropometrics, the content of which is incorporated herein by reference.

In some embodiments, the support 100 is a semi-customized headform, which is tailored to the average characteristics and features of an anticipated group of users. The characteristics and features include, but are not limited to, bizygomatic breadth, nasal root breadth, head circumference, face length, interpupillary distance, nose bridge length, nose bridge width, ear position and size, cheekbone width, jawline and chin profile, forehead height and shape, and the like. In some embodiments, the support 100 is a headform fully customized to simulate the head of the intended user.

The support 100 can be made from any suitable material. In some embodiments, the material is selected based on the ability to simulate the relevant anthropometric characteristics of a head, Exemplary, non-limiting materials include metals, plastics, polymers, fiberglass, rubber, and the like. Optionally, the support 100 is formed from a plastic material. In some embodiments, the support 100 includes an outer surface that mimics the skin.

Optionally, the support 100 includes one or more external shapes simulating the shape of an eye per average dimensions and relative dimensions in the headform. As used herein, "eyes" 102 refers to this external shape. In some embodiments, the eyes 102 serve as a guide for positioning the optical device 300. In some embodiments, the eyes 102 define an aperture 108 that serves as the reference aperture for calculating the eye relief measurement. Referring now to FIG. 2, in some embodiments, the support 100 includes an external surface 106 that defines a hollow interior 107. In some embodiments, the external surface 106 defines an opening 101 providing access to the hollow interior 107. For example, when the support 100 is a headform, the opening 101 may be positioned at an inferior end of the support 100, such that the neck of the headform is open along the bottom, providing access to the hollow interior 107.

In some embodiments, the external surface 106 defines one or more channels 103. In some embodiments, the channel 103 extends through the external surface 106 perpendicularly to a vertical axis of the support 100. In some embodiments the channel 103 is adapted to receive the measuring device 200, described in greater detail herein.

In some embodiments, the channel 103 corresponds to an eye 102 on the support 100. Optionally, the channel 103 is aligned with a center of the eye 102. Optionally, each channel 103 terminates at an aperture 108 at the center of the eye 102. In some embodiments, the aperture 108 simulates the position of a pupil of the user(s). For example, in some embodiments, the channel 103 extends from the hollow interior 107 of the support 100 to the eyes 102 such that the channel terminates at an aperture 108 defined by the eye 102 at a first end and at the hollow interior 107 at the second end.

Optionally, the channels 103 have a fixed distance 105 measured from the aperture 108 to a vertical surface 104 disposed in the hollow interior 107. In some embodiments, the aperture 108 defines a first end of the channel 103 and the vertical surface 104 defines a second end of the channel 103. As described above, the system 10 generally includes a measuring device 200. The measuring device 200 is inserted into one of the plurality of channels 103 via the hollow interior 107 of the support 100 through the opening 101, described in greater detail herein. Referring now to FIG. 3, the measuring device 200 generally includes a rod 201 and a locking ring 206, slidably coupled to the rod 201. The rod 201 may be made of any suitable material. Exemplary, non-limiting materials include metals (e.g., steel, aluminum, etc.), plastics, ceramics, fiberglass, carbon fiber, composite materials, and the like. Optionally, the rod 201 is sized and shaped to advance through the channel 103 and the aperture 108 to measure the eye relief distance as described in greater detail herein.

In some embodiments, the measuring device 200 is configured to fixedly couple the locking ring 206 to the rod 201. Optionally, the locking ring 206 is slidably coupled to the rod 201 and includes a locking mechanism 205. As shown in FIG. 3, the measuring device 200 includes the locking ring 206 and locking mechanism 205 to secure the rod 201 into place after the rod 201 contacts the optical device 300. Optionally, the locking mechanism 205 is configured to hold the locking ring 206 in a specific position on the rod 201. In some embodiments, the locking mechanism 205 is actuated to prevent the locking ring 206 from translating along the rod 201.

It will be appreciated that any suitable locking ring and/or locking mechanism is contemplated and possible. For example, and without being bound by theory the locking mechanism 205 may be actuated to create an interference fit between an internal portion of the locking ring 206 and the rod 201 so that the locking ring 206 is prevented from translating along the rod 201. Other exemplary locking rings and locking mechanisms include snap fit mechanisms, force fit mechanisms, threaded fasteners, and the like.

Figure 4:
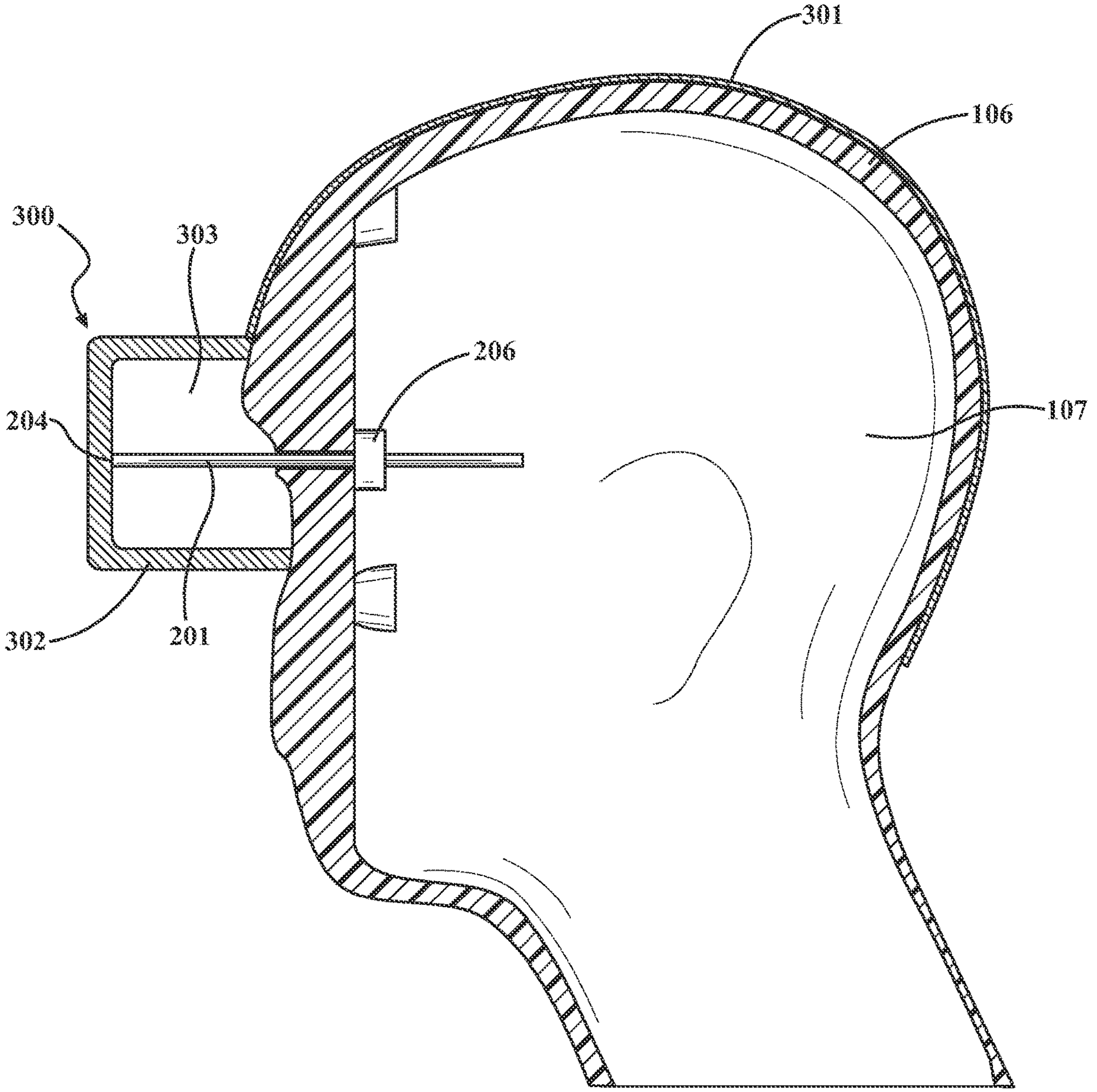
FIG. 4 depicts a partial cutaway of the system of FIG. 1 in operation, according to one or more embodiments described herein.

When measuring eye relief, and as described in greater detail herein, after an optical device 300 is placed on the support 100, such as shown in FIG. 4, the rod 201 is inserted through the channel 103 until an end 204 of the rod 201 contacts the optical device 300. The locking ring 206 is translated along the rod 201 until a flat surface 202 of the locking ring 206 contacts the vertical surface 104. The locking mechanism 205 is actuated to secure the rod 201 in the locking ring 206.

In some embodiments, the rod 201 includes an indicator 203. Optionally, the indicator 203 is a fixed distance 207 from the end 204 of the rod 201. In some embodiments, the distal side of the indicator 203 is used to indicate the fixed distance. In some embodiments, the proximal side of the indicator 203 is used to indicate the fixed distance. In other embodiments, the center of the indicator 203 is used to indicate the fixed distance.

In some embodiments, the fixed distance 207 between the end 204 of the rod 201 and the indicator 203 is equivalent to the length of fixed distance 105. In such embodiments, it will be appreciated that the distance between the end 204 of the rod 201 and the indicator 203 is equivalent to the length of the channel 103. In some embodiments, the indicator 203 is adjustable on the rod 201 such that the measuring device 200 may be used with channels 103 of various lengths.

In embodiments, the eye relief 400 is the distance between the locking ring 206 and the indicator 203 when the end 204 of the rod 201 is touching the optical device 300. Thus, the eye relief 400 is the distance from the aperture 108 to the optical device 300. In some embodiments, the distal side of the indicator 203 is used to measure the eye relief 400. In some embodiments, the proximal side of the indicator 203 is used to measure the eye relief 400. In other embodiments, the center of the indicator 203 is used to measure the eye relief 400.

Optionally, the rod 201 includes a plurality of markers, spaced at intervals, optionally regular intervals. In some embodiments, the markers indicate a distance from an end 204 of the rod 201 to the marker. In other embodiments, the markers indicate a distance from the indicator 203. The markers can be spaced apart by any appropriate measurement, including but not limited to millimeters, centimeters, inches, etc. In some embodiments, the markers indicate a fraction of the measurement. Optionally, the markers are spaced apart by a millimeter. Any suitable marker to indicate the distance is contemplated and possible. Exemplary markers include hash marks, numbers, dots, indentions, etc.

In some embodiments, the markers are positioned to indicate a distance between the locking ring 206 and the end 204 of the rod 201. In other embodiments, the markers are positioned to indicate a distance between the indicator 203 and the locking ring 206.

As noted above, measuring eye relief using the system 10 requires the optical device 300 to be placed on the support 100 in the manner that a user would wear the device.

Optionally, the optical device 300 is supported by the support 100, such that the optical device rests on, touches, squeezes, encloses, or otherwise interfaces with the external surface 106 of the support 100. As shown in FIG. 4, the optical device 300 may include any device in which the eye relief is calculated. Exemplary, non-limiting examples of optical devices include head-mounted displays, helmet-mounted displays, thermal imaging devices, binoculars, monoculars, telescopes, night-vision goggles, range finders, periscopes, target designators, infrared illuminators, weapons magnifiers, image intensifiers, scopes, and the like.

In some embodiments, the optical device 300 includes one or more components 301 that position and/or secure the optical device 300 on a user's head. Optionally, these components 301 include ear pieces, straps, Velcro, elastic bands, or the like to position the optical device 300 on the user. In embodiments, these components 301 secure the optical device 300 to the support 100 to enable accurate measuring of the eye relief. In some embodiments, the optical device 300 includes a structure 302 that fully encloses a user's head.

Generally, as illustrated in FIG. 4, the optical device 300 defines an eye-relief space 303, disposed between the optical device 300 and the external surface 106 of the support 100. In some embodiments, the eye-relief space 303 is in fluid communication with the hollow interior 107 via the channels 103, such as depicted in FIG. 4, to provide access for the measuring device 200 to advance through the channel 103 and into the eye-relief space 303.

Methods of using the system, described in greater detail herein, to measure eye relief generally involve mounting the optical device 300 to the support 100. The optical device 300 is optionally mounted in the manner that a user would wear or operate the device. For example, and not by limitation, when the support 100 is a headform, the optical device 300 is mounted such that it covers the eyes 102 of the headform. In some embodiments, the optical device 300 is positioned to allow the measuring device to pass through the aperture 108.

The measuring device 200 is inserted into the hollow interior 107 of the support 100. Optionally, the measuring device 200 is inserted in the hollow interior 107 of the support through an opening 101 at the inferior end of the support 100. For example, when the support 100 is a headform, the measuring device 200 is inserted into an opening 101 in the neck of the headform.

In some embodiments, the rod 201 of the measuring device 200 is inserted through the channel 103 of the support 100 and advanced into the eye-relief space 303. Optionally, the rod is advanced into the eye-relief space through the aperture 108 on the eye 102.

In some embodiments, the rod 201 is advanced through the channel 103, through the aperture 108, and through the eye-relief space 303. Optionally, the rod 201 is advanced through the eye-relief space 303 until the end 204 of the rod 201 contacts the optical device 300. The distance from the aperture 108 to the end 204 of the rod 201 while contacting the optical device 300 is the eye relief 400. Said another way, the eye relief 400 is the distance between the aperture 108 and the optical device 300.

Optionally, when the end 204 of the rod 201 contacts the optical device 300, the locking ring 206 is locked in place on the rod 201. In some embodiments, the locking ring 206 is translated along the rod 201 to contact the support 100 in the hollow interior 107. Optionally, the locking ring 206 is translated along the rod 201 until the locking ring 206 contacts the vertical surface 104 of the support 100. Optionally, the locking ring 206 is locked into place on the rod 201. In some embodiments, the locking mechanism 205 locks the locking ring 206 in place on the rod 201. Optionally, the locking mechanism 205 is actuated by a user to lock the locking ring 206 in place.

As used herein, the terms "horizontal" and "vertical" are relative terms only, are indicative of a general relative orientation only, and do not necessarily indicate perpendicularity. These terms also may be used for convenience to refer to orientations used in the figures, which orientations are used as a matter of convention only and are not intended as characteristic of the devices shown. The present invention and the embodiments thereof to be described herein may be used in any desired orientation. Moreover, horizontal and vertical walls need generally only be intersecting walls, and need not be perpendicular.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" or "including" a second component, it is contemplated that, in some embodiments, the first component "consists" or "consists essentially of" the second component. Additionally, the term "consisting essentially of" is used in this disclosure to refer to quantitative values that do not materially affect the basic and novel characteristic(s) of the disclosure.

It should be understood that any two quantitative values assigned to a property or measurement may constitute a range of that property or measurement, and all combinations of ranges formed from all stated quantitative values of a given property or measurement are contemplated in this disclosure.

While particular embodiments have been illustrated and described herein, it should be understood that various other changes and modifications may be made without departing from scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining eye relief comprising:

placing an optical device on a support;

extending a rod of a measuring device through a channel of the support into an eye-relief space of the optical device;

contacting an end of the rod to the optical device;

translating a locking ring along the rod until the locking ring contacts the support; and locking the locking ring in position by actuating a locking mechanism;

wherein the distance between the end of the rod and an indicator is equivalent to a length of the channel, such that the eye relief is determined as a distance between the indicator and a position on the locking ring contacting the support.

2. The method of claim 1, wherein the support comprises a human headform.

3. The method of claim 2, wherein the support comprises an external surface forming a shape simulating an external surface of one or more eyes.

4. The method of claim 3, wherein the channel terminates at an aperture defined by the external surface of the eye at a first end and at a hollow interior of the support at a second end.

5. The method of claim 1, wherein the support is an animal headform.

6. The method of claim 1, wherein the support comprises an external surface defining a hollow interior.

7. The method of claim 6, wherein the external surface defines an opening for accessing the hollow interior, wherein the opening is positioned at an inferior end of the support.

8. The method of claim 7, wherein the measuring device is inserted through the opening.

9. The method of claim 3, wherein the support comprises a vertical surface disposed in the hollow interior.

10. The method of claim 9, wherein contacting the locking ring with the support comprises contacting the vertical surface with the locking ring.

11. The method of claim 9, wherein the length of the channel is defined by the external surface at a first end and the vertical surface at a second end.

12. A system for measuring eye relief comprising:

a support comprising an external surface defining one or more channels, wherein the external surface forms a shape simulating an external surface of one or more eyes, and wherein the one or more channels extend from the external surface perpendicularly to a vertical axis of the support; and a measuring device comprising:

a rod, adapted to be inserted through the one or more channels, wherein the rod comprises an indicator positioned from an end of the rod at a distance equivalent to the length of the one or more channels; and a locking ring slidably coupled to the rod.

13. The system of claim 12, wherein the measuring device further comprises a locking mechanism adapted to secure the locking ring to the rod.

14. The system of claim 12, wherein the support further comprises a vertical surface disposed in a hollow interior, wherein the vertical surface defines an end of the one or more channels.

15. The system of claim 12, wherein the indicator is adjustable.

16. The system of claim 12, wherein the support is a human headform.

17. The system of claim 12, wherein the support is an animal headform.

18. The system of claim 17, wherein the animal headform is a dog headform.

19. The system of claim 12, wherein the external surface of one or more eyes defines an aperture, wherein the aperture is positioned at a central point of the one or more eyes to simulate a pupil, and wherein the aperture defines an end of the one or more channels.

* * * * *